(12) United States Patent
Cambou

(10) Patent No.: US 11,010,465 B2
(45) Date of Patent: *May 18, 2021

(54) PASSWORD MANAGEMENT WITH ADDRESSABLE PHYSICAL UNCLONABLE FUNCTION GENERATORS

(71) Applicant: Arizona Board of Regents on Behalf of Northern Arizona University, Flagstaff, AZ (US)

(72) Inventor: Bertrand F Cambou, Flagstaff, AZ (US)

(73) Assignee: Arizona Board of Regents on Behalf of Northern Arizona University, Flagstaff, AZ (US)

( * ) Notice: Subject to any disclaimer, the term of this patent is extended or adjusted under 35 U.S.C. 154(b) by 270 days.

This patent is subject to a terminal disclaimer.

(21) Appl. No.: 16/415,235

(22) Filed: May 17, 2019

(65) Prior Publication Data

US 2019/0354672 A1 Nov. 21, 2019

Related U.S. Application Data

(60) Provisional application No. 62/672,748, filed on May 17, 2018.

(51) Int. Cl.
 H04L 29/06 (2006.01)
 G06F 21/40 (2013.01)
 G06K 9/62 (2006.01)
 H04L 9/32 (2006.01)

(52) U.S. Cl.
 CPC .......... *G06F 21/40* (2013.01); *G06K 9/6215* (2013.01); *H04L 9/3278* (2013.01)

(58) Field of Classification Search
 CPC .......... G06F 21/40; G06F 21/71; G06F 21/45; G06K 9/6215; H04L 9/3278; H04L 9/0643; H04L 9/3236
 See application file for complete search history.

(56) References Cited

U.S. PATENT DOCUMENTS

| 2016/0078252 | A1* | 3/2016 | Chandra | G06F 21/72 713/190 |
| 2018/0129801 | A1* | 5/2018 | Cambou | H04L 9/0643 |
| 2018/0329962 | A1* | 11/2018 | Schrijen | G06F 16/2468 |

* cited by examiner

*Primary Examiner* — Carl G Colin
*Assistant Examiner* — Hany S. Gadalla
(74) *Attorney, Agent, or Firm* — Quarles & Brady LLP

(57) ABSTRACT

Systems and methods for improving security in computer-based authentication systems by using physical unclonable functions are presented. A computing device used to provide authentication includes an array of physical unclonable function devices. Rather than storing user passwords or message digests of passwords, the computing device generates a message digest based on a combination of a user ID and corresponding password. This message digest forms part of challenge (together with instructions for responding to the challenge). A challenge response generated by measuring physical parameters of set of physical unclonable function devices specified by the message digest. This allows the computing device to provide authentication without storing information which could be used by an attacker to compromise user credentials.

20 Claims, 13 Drawing Sheets

| Step | Description of the instruction | Data stream/information | Where |
|---|---|---|---|
| 1.0 | Hashing of the password PWj | h(PWj) | Server |
| 2.0 | Convert the hash message digest h(PWj) into the address XY | H(PWj) → XY | APG |
| 3.0 | Extract the Responses – n-bits located pass the address XY | {n-bits Responses} | APG |
| 3.1 | Measure parameter P для the n-cells | {P1, P2, ..., Pn} | APG |
| 3.2 | Generate data stream Rej ∈ {0, 1}, the challenge | Rej = {R1, R2, ..., Rn} | APG |
| 4.0 | XORing the user ID Userj with the password PWj | Userj ⊕ PWj | Server |
| 5.0 | Convert the message digest h(Userj ⊕ PWj) into the address Addi | H(Userj ⊕ PWj) → Addi | Server |
| 6.0 | Read the challenges Chj in the database at the address Addi | Addi ; Chj | Database |
| 7.0 | Hamming distance Hj between Chj and Rej | Hj number of "1"s Chj ⊕ Rej | Server |
| 8.0 | Authentication if Hj below the threshold | Yes or No | Server |

FIG. 3

| Step | Description of the instruction | Data stream/information | Where |
|---|---|---|---|
| 1.0 | Hashing of the password PWj | h(PWj) | Server |
| 2.0 | Convert the hash message digest h(PWj) into the address XY | H(PWj) → X Y | APG |
| 3.0 | Extract the challenge – n-bits located pass the address XY | {n-bits challenge} | APG |
| 3.1 | Measure parameter ?f for the n-cells | {P1, P2, ..., Pn} | APG |
| 3.2 | Generate data stream Chj ∈ {0, 1}, the challenge | Chj = {C1, C2, ..., Cn} | APG |
| 4.0 | XORing the user ID Userj with the password PWj | Userj ⊕ PWj | Server |
| 5.0 | Convert the message digest h(Userj ⊕ PWj) into the address Addl | H(Userj ⊕ PWj) → Addl | Server |
| 6.0 | Store the challenges Chj in the database at the address Addl | Addl ; Chj | Database |

*FIG. 8*

| Step | Description of the instruction | Data stream/information | Where |
|---|---|---|---|
| 1.0 | Hashing of the password $PW_j$ | $h(PW_j)$ | Server |
| 2.0 | Convert the hash message digest $h(PW_j)$ into the address XY | $H(PW_j) \rightarrow XY$ | APG |
| 3.0 | Extract the Responses – n-bits located pass the address XY | {n-bits Responses} | APG |
| 3.1 | Measure parameter $P$ for the n-cells | $\{P_1, P_2, ..., P_n\}$ | APG |
| 3.2 | Generate data stream $Re_j \in \{0, 1\}$, the challenge | $Re_j = \{R_1, R_2, ..., R_n\}$ | APG |
| 4.0 | XORing the user ID $User_j$ with the password $PW_j$ | $User_j \oplus PW_j$ | Server |
| 5.0 | Convert the message digest $h(User_j \oplus PW_j)$ into the address $Add_i$ | $H(User_j \oplus PW_j) \rightarrow Add_i$ | Server |
| 6.0 | Read the challenges $Ch_j$ in the database at the address $Add_i$ | $Add_i ; Ch_j$ | Database |
| 7.0 | Hamming distance $H_j$ between $Ch_j$ and $Re_j$ | $H_j$ number of "1"s $Ch_j \oplus Re_j$ | Server |
| 8.0 | Authentication if $H_j$ below the threshold | Yes or No | Server |

*FIG. 9*

PASSWORD MANAGEMENT WITH ADDRESSABLE PHYSICAL UNCLONABLE FUNCTION GENERATORS

CROSS-REFERENCE TO RELATED APPLICATIONS

The present application claims priority to U.S. Provisional Application 62/672,748 entitled "Password Management with Addressable Physically Unclonable Function Generators" and filed on May 17, 2018.

BACKGROUND OF THE INVENTION

Conventional authentication systems store user authentication information including user identifiers (such as a number or username) and associated authentication credentials (such as passwords) in lookup tables or databases. To improve security, many systems obscure the user identifiers and/or the credentials by encrypting the user information or applying hashing functions to the user information so that a hacker cannot readily determine users' credentials by obtaining unauthorized access to the user authentication information stored by the system. In some conventional systems, a user has no fixed credentials and instead responds to an authentication challenge instructing the user (or user device) to perform mathematical or other operations on information shared by the user and the authentication system but unknown to a potential hacker or other unauthorized third party.

BRIEF SUMMARY

An example embodiment comprises a method of providing authentication and securely storing authentication data in a computing system provided with an array of physical unclonable function devices (PUF array). The method comprises causing processing circuitry of the computing system to receive a first user identifier and a first user password corresponding to the first user identifier. The method further comprises causing the circuitry to generate a first message digest using the first user password and a second message digest using a combination of the first user identifier with additional information associated with the first user identifier.

The method further comprises causing the circuitry to generate a first set of PUF characteristics and a first initial challenge response. The first set of PUF characteristics is generated by measuring physical parameters of PUF devices belonging to a portion of PUF array specified by the first message digest. The first initial challenge response is generated by performing, using the first set of PUF characteristics, a challenge generation procedure. The method further comprises causing the circuitry to store the first initial challenge response in an addressable data structure at an address corresponding to the second message digest.

The challenge response procedure includes receiving an input containing PUF characteristics; and executing challenge instructions using the input PUF characteristics to generate a challenge response output. The challenge instructions specifying rules for generating the challenge response output from the input PUF characteristics.

In another example embodiment, a method of providing authentication and securely storing authentication data in a computing system provided with an array of physical unclonable function devices (PUF array) comprises causing processing circuitry of the computing system to receive a first user identifier and a first user password corresponding to the first user identifier.

The method further comprises causing processing circuitry of the computing system to generate a first message digest and a second message digest; a first set of PUF characteristics and a second set of PUF characteristics; a first initial challenge response; and a first challenge response address. The first message digest is generated using the first user password. The second message digest is generated using a combination of the first user identifier with additional information associated with the first user identifier. The method further comprises causing processing circuitry of the computing system to store the first initial challenge response in a data structure at an address corresponding to the first challenge response address.

The first set of PUF characteristics is generated by measuring physical parameters of PUF devices belonging to a portion of the PUF array specified by the first message digest. The second set of PUF characteristics is generated by measuring physical parameters of PUF devices belonging to a portion of the PUF array specified by the second message digest. The first initial challenge response is generated by executing first challenge instructions using the first set of PUF characteristics. The first challenge instructions specify first rules for generating challenge responses using measurements of physical parameters of sets of PUF devices. The first challenge response address is generated by executing second challenge instructions using the second set of PUF characteristics. The second challenge instructions specify second rules for generating challenge responses using measurements of physical parameters of sets of PUF devices.

In another example embodiment, a computer-implemented authentication system comprises processing circuitry and memory, coupled to the processing circuitry. The processing circuitry includes an array of physical unclonable function (PUF) devices and the memory stores executable instructions.

When executed by the processing circuitry, the instructions cause the processing circuitry to receive user credentials for a set of users, including a user identifier and a password for each user. Executing the instructions further causes the processing circuitry to generate, for each user, a first message digest from the password for that user; and a second message digest from a combination of the password for that user and the user identifier for that user. Executing the instructions further causes the processing circuitry to derive an initial challenge response for each user; store each initial challenge response within an addressable data structure in the memory at an address determined by the second message digest; and receive authentication requests from users. The initial challenge response for each user is derived using the first message digest by obtaining PUF characteristics from a portion of the PUF array specified by the first message digest. Each authentication request includes a submitted identifier and a submitted password and Executing the instructions further causes the processing circuitry to generate a third message digest from the submitted password for each authentication request; and a fourth message digest from a combination of the submitted password and the submitted user identifier for each authentication request. Executing the instructions further causes the processing circuitry to derive an authentication challenge response for each authentication request using the third message digest by obtaining PUF characteristics from a portion of the PUF array specified by the third message digest. Executing the instructions further causes the processing circuitry to respond to each authentication request by retrieving an initial challenge response from the data structure using an address corresponding to the fourth message digest; and comparing said initial challenge response to the authentication challenge response.

The above features and advantages of the present invention will be better understood from the following detailed description taken in conjunction with the accompanying drawings.

BRIEF DESCRIPTION OF THE DRAWINGS

The drawings described herein constitute part of this specification and includes exemplary embodiments of the present invention which may be embodied in various forms. It is to be understood that in some instances, various aspects of the invention may be shown exaggerated or enlarged to facilitate an understanding of the invention. Therefore, drawings may not be to scale.

FIG. 3 depicts a table illustrating aspects of the method illustrated in FIG. 2.

FIG. 8 depicts a table summarizing preliminary steps of the authentication method illustrated by FIGS. 6-7

FIG. 9 depicts a table summarizing additional steps of the authentication method illustrated by FIGS. 6-8

DETAILED DESCRIPTION

The described features, advantages, and characteristics may be combined in any suitable manner in one or more embodiments. One skilled in the relevant art will recognize that the circuit may be practiced without one or more of the specific features or advantages of a particular embodiment. In other instances, additional features and advantages may be recognized in certain embodiments that may not be present in all embodiments.

Reference throughout this specification to "one embodiment," "an embodiment," or similar language means that a particular feature, structure, or characteristic described in connection with the embodiment is included in at least one embodiment. Thus appearances of the phrase "in one embodiment," "in an embodiment," and similar language throughout this specification may, but do not necessarily, all refer to the same embodiment. References to "users" refer generally to individuals accessing a particular computing device or resource, to an external computing device accessing a particular computing device or resource, or to various processes executing in any combination of hardware, software, or firmware that access a particular computing device or resource. Similarly, references to a "server" refer generally to a computing device acting as a server, or processes executing in any combination of hardware, software, or firmware that access control access to a particular computing device or resource.

Conventional authentication systems have disadvantages. For example, if an attacker gains access to a lookup table or database storing the user authentication information, the attacker can apply various computational approaches to eventually decrypt or otherwise decode the information. As example, since many hashing functions are well-known, an attacker may guess a password, input that guessed password into a hashing function and find the output in the compromised table.

Accordingly, embodiments disclosed herein address these and other shortcomings by ensuring that authentication data remains secure even if that data is accessed or stolen. Rather than storing authentication data such as password as message digests produced by hash functions, embodiments herein use message digests as challenges supplied to a physical unclonable function (PUF) device. The resulting challenge responses obtained are then stored. If an attacker obtains access to the authentication data, attempting to "guess" passwords is useless, because neither passwords nor hashes of passwords are stored by the system. Because each PUF device is unique the only way to identify a valid password by guessing would require the attacker to have access the PUF.

Figure 1:
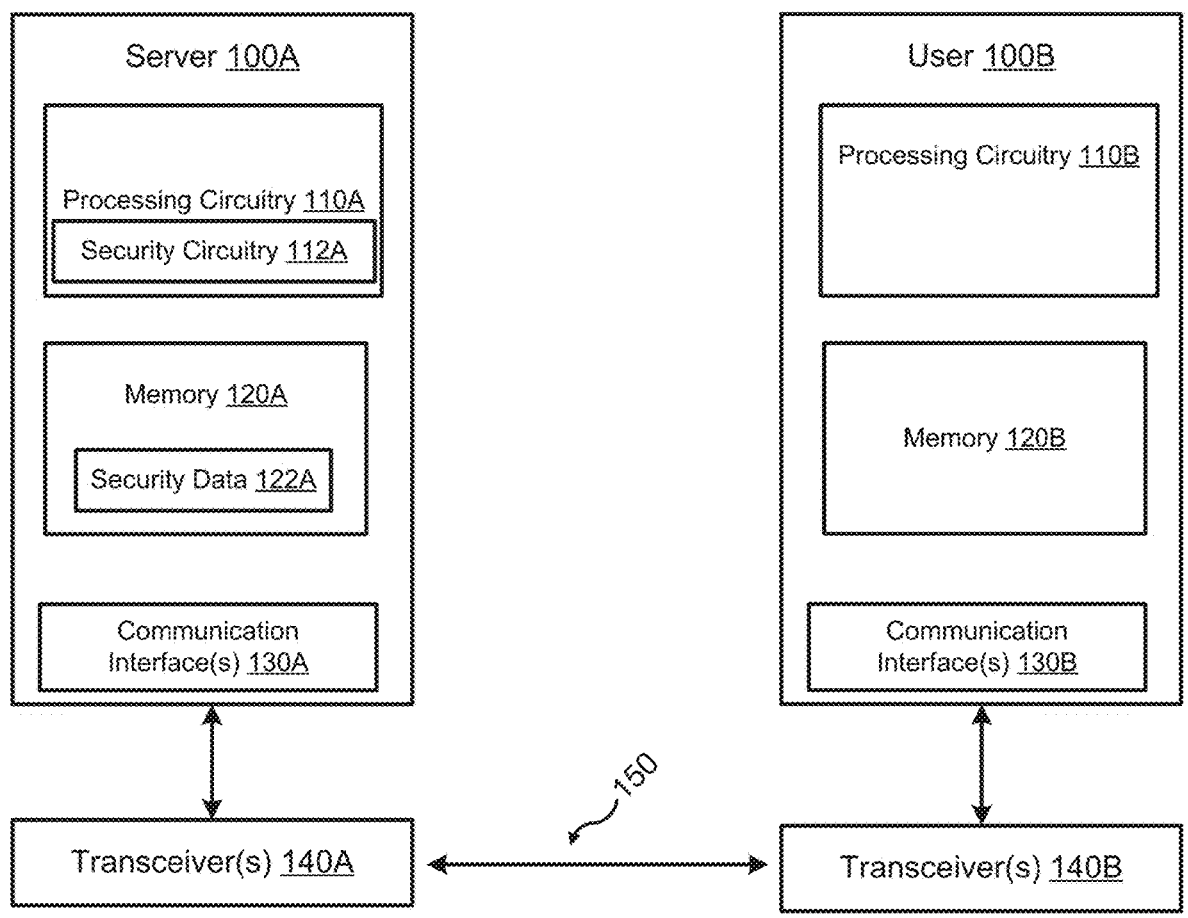
FIG. 1 depicts a block diagram describing example systems in which embodiments of the invention may be practiced.

FIG. 1 is a schematic illustrating a computing system 100A in which embodiments disclosed herein may be practiced. In this example, server 100A is an authentication server or other computing device which stores information used to authenticate users and client 100B is an example "client" or other "user" device. The computing systems 100A/B each have respective processing circuitry 110A/B, memory 120A/B, communication interfaces 130A/B, and transceivers 140A/B. Each system communicates sends and/or receives information via its communication interface 140A/B. The communication interfaces 130A/B are coupled to transceivers 140A/B which send signals over a communication channel 150. In embodiments disclosed herein the processing circuitry 110A of server 100A includes security circuitry 112A. Similarly, in embodiments disclosed herein the memory 120A of computing system 110A stores security data 122A. It should be understood that while the example of FIG. 1 involves a separate client 100B, embodiments disclosed herein may be practiced entirely within a single system such as the server 100A.

In preferred embodiments disclosed herein the processing circuitry 110A includes a dedicated PUF device such as the devices described later in connection to FIGS. 4 and 5, for example. In such embodiments, the security circuitry 110A is configured to respond to an authentication challenge which specifies an address (or range of addresses) in the PUF device and a set of operations to perform in order to generate a unique response to the authentication challenge. Such embodiments are designed to store security data 122A produced using the security circuitry 112A in the memory 120A. In such embodiments, the processing circuitry 110A is configured to generate authentication challenges and receive responses to those challenges. The responses and challenges may are saved as part of the security data 122A.

Figure 2:
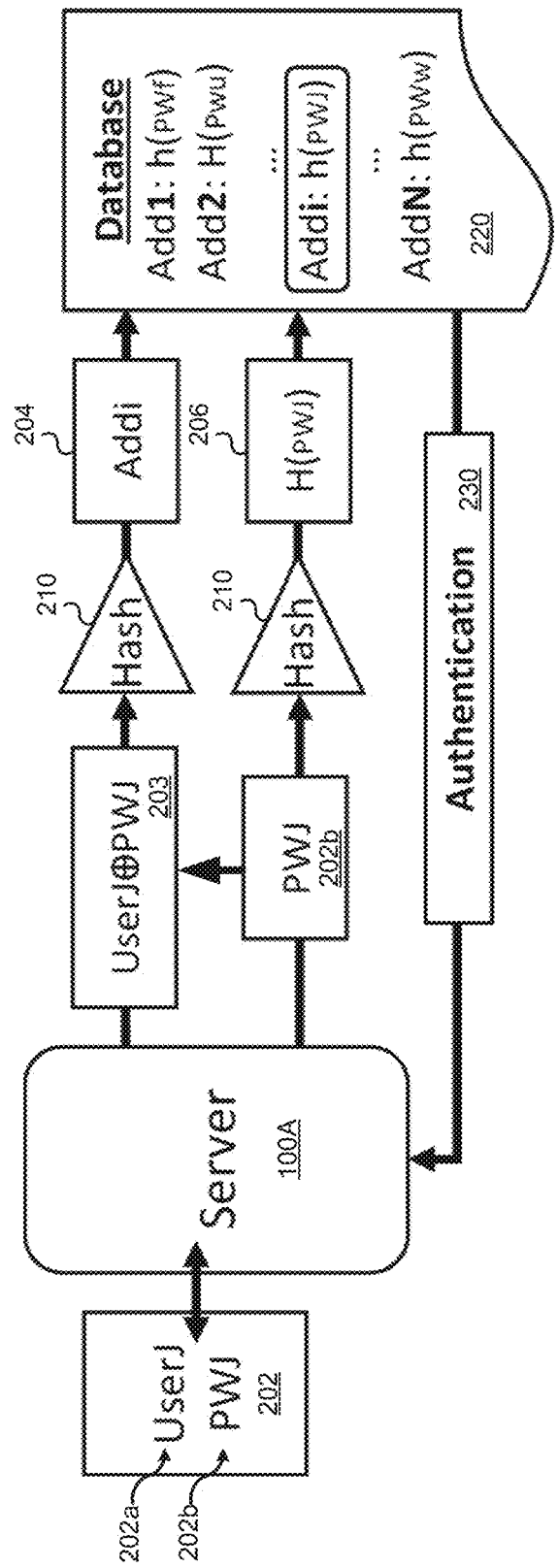
FIG. 2 depicts a block diagram describing elements of an example prior-art authentication system using a database and hashing functions.

FIG. 2 depicts a method of securing authentication information using hashing functions which is useful to understand elements of embodiments disclosed herein. Hash functions and one-way cryptographic methods can be used to protect or replace the tables containing user IDs with their corresponding passwords by look-up tables. As shown in FIG. 2, Hashing the password for User "J" ($PW_J$) with the hash function 210 results in the first message digest $h(PW_J)$ 206; the user ID $User_J$ and $PW_J$ are XORed; hashing $User_J \oplus PM_J$(203) results in the message digest 204, notated as $h(User_J \oplus PW_J)$. The second message digest generates the coordinate XY of the look-up table storing the first message digest.

During authentication, users provide their user ID/password pairs to the server 100A; the information extracted from the table at the corresponding address is then compared with the message digest provided by the password. When SHA-1 is replaced by more powerful hashing functions (e.g., SHA-3), such look-up tables are much more secure than the tables directly storing user ID/password pairs. However, if look-up tables storing message digests are compromised or stolen, the information can be recovered by an attacker using password guessing methods, big data analysis, and brute force hashing of commonly-used passwords.

Figure 3:
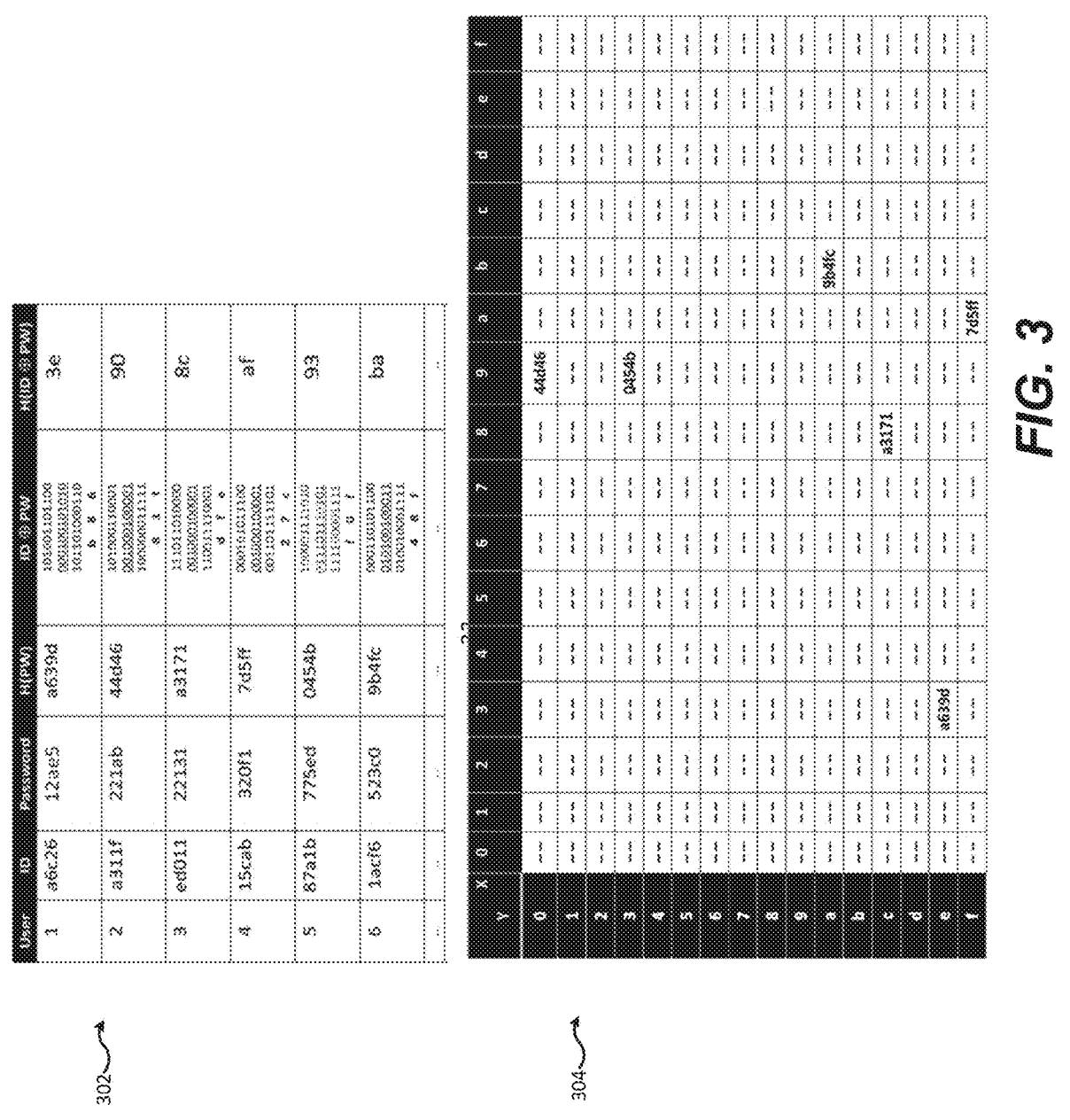

The scheme described in connection to FIG. 2 above is further illustrated by the tables 302 and 304 shown in FIG. 3. Table 302 lists six example users (User #1-User #6). Each user has a user ID and a password. For each example user, table 302 shows the user's ID and password, along with a message digest of the user's password, the result of combining the user's ID and password using the XOR function, and a message digest of that combination.

Table 304 is a representation of a 2D array used to store authentication information for each of the example users. The array is indexed using a 'X' coordinate and a 'Y' coordinate. Values for each example user are shown at locations in the array chosen as described below.

For example, as shown in the first row of table 302, User #1 has a user ID "a6c26", a password "12ae5." The message digest of User #1's password is 0xA639 generated with SHA-1 (following the convention of indicating a hexadecimal value by the prefix '0x'). Only the first five characters of the message digest are kept. XORing the first three hexadecimal characters of the user ID and the password produces the value 0xB86. Hashing of 0xB86 with SHA-1 generates a message digest that has '3E' as first two hexadecimal characters. Then the value 0xA639 is stored in the table at address 0x3E, where the first hexadecimal digit is the 'X' coordinate and the second hexadecimal digit is the 'Y' coordinate. Five more user ID/password pairs are stored in a similar way in the bottom right look-up table of FIG. 3. Such a method is applicable to store very large quantities of user ID/password pairs.

Figure 4:
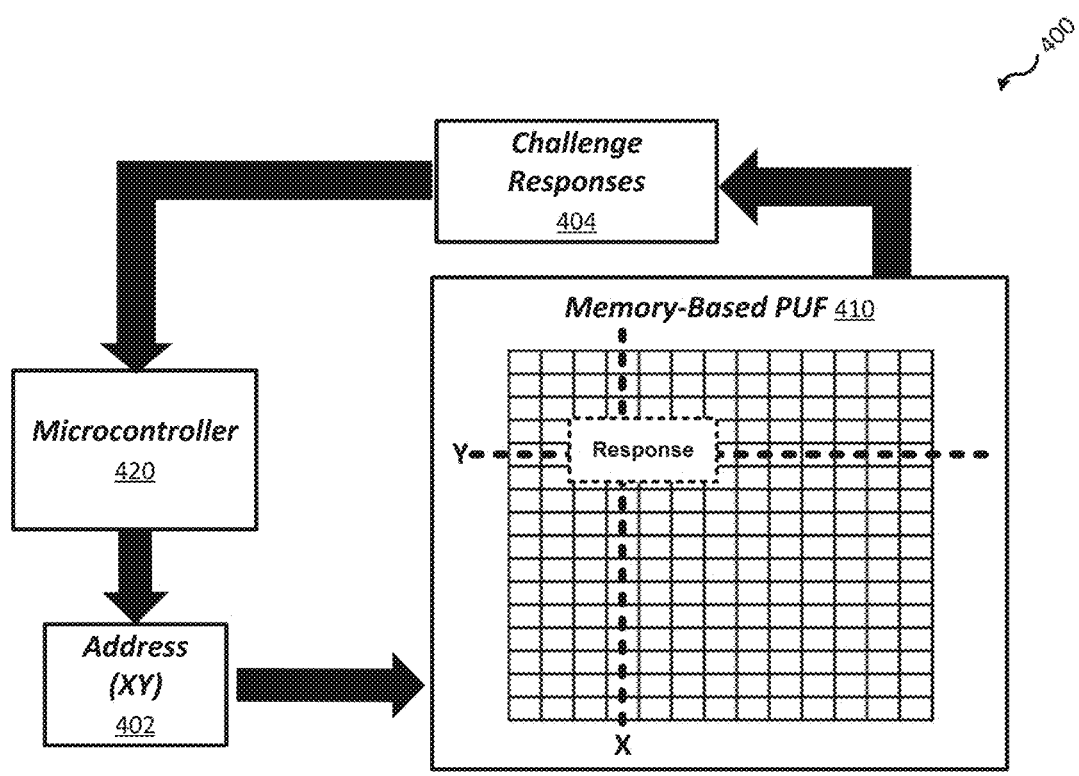
FIG. 4 depicts a schematic view of an example prior-art memory-based physical unclonable function (PUF) device usable to generate responses to authentication challenges.
Figure 5:
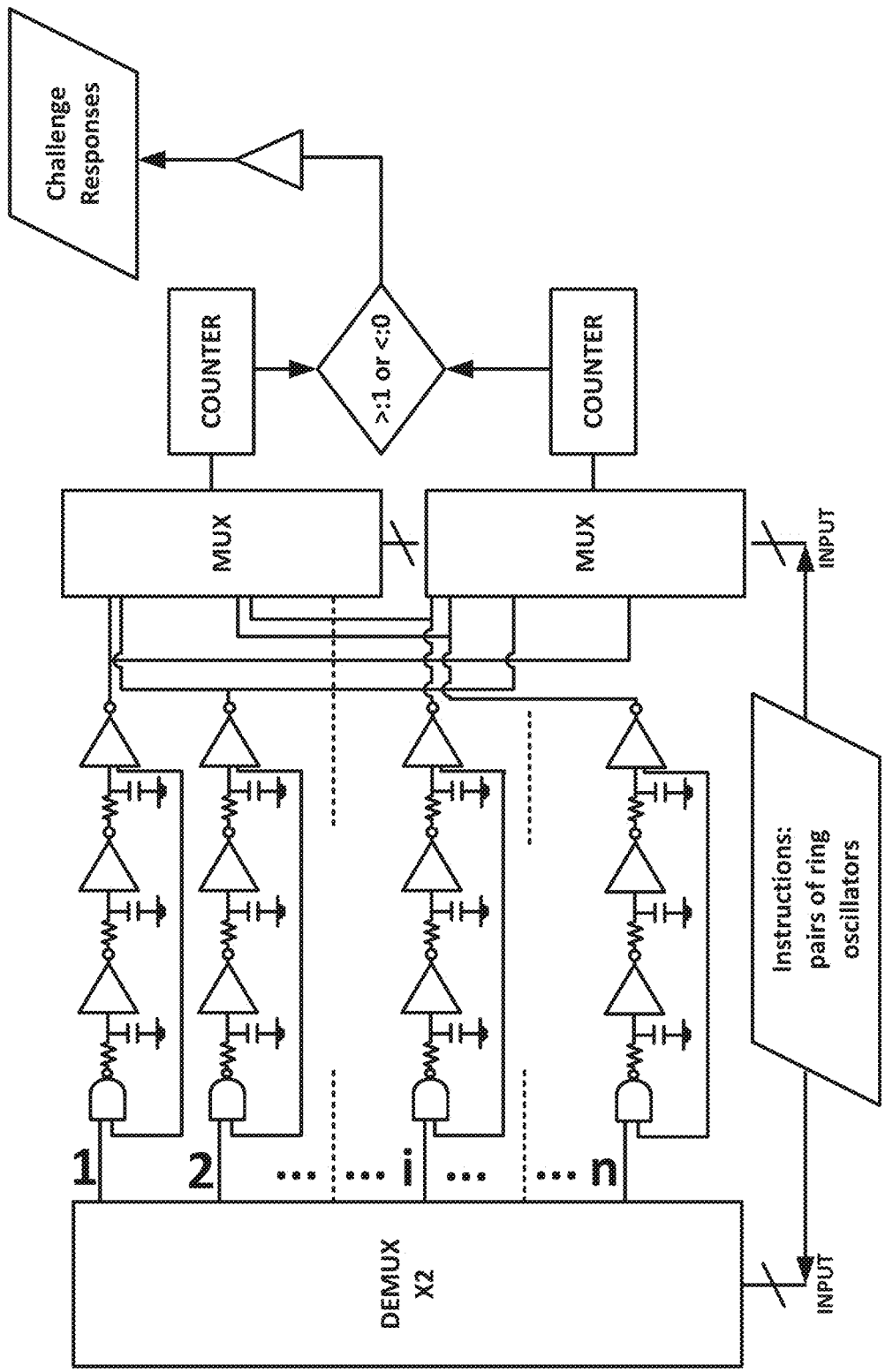
FIG. 5 depicts a schematic view of an example prior-art ring-oscillator-based PUF device usable to generate responses to authentication challenges.

FIG. 4 is a schematic of a memory-based addressable PUF generator (APG) 400. In a simplified example, a microcontroller 420 accesses an address (or range of addresses) 402 of the PUF array 410, and receives a challenge response 404. In the simplest case, the address 402 is the challenge and the values stored in the PUF array 410 are the responses 404. Alternatively, the microcontroller 420 may execute instructions causing it to perform a set of mathematical or other operations (which, together with the specified address or address range 402 constitute the challenge) on the values retrieved from the PUF array 410. Alternatively, another generic method to generate challenge responses from memory devices is to characterize a particular parameter P of the cells of the array. The values of parameter P vary cell to cell and follow a distribution with a median value T. In order to generate challenge response, all cells with P<T generate "0" states, and the others generate "1" states. Assuming that the measurements results from one PUF device are distinct from those of any other PUF device and that the measurement results of any one PUF device are suitably reproducible, resulting streams of data can be used as PUF challenge responses for authentication purposes, where the input used to generate each response is stored for future use as a challenge.

The underlying devices in an example PUF device may include arrays of transistors and circuitry configured to measure variations in threshold voltages or other physical device characteristics. Memory structures, such as SRAM, DRAM, Flash, ReRAM, and MRAM, are also excellent elements to generate strong PUFs. PUF devices may also be designed to include the use of logic components with gate delays and arbiters and ring oscillators. FIG. 5 depicts an example PUF device in which pairs of ring oscillators are analyzed. In the example device shown, if the number of ring oscillations routed through the top MUX in a given period is greater than the number of ring oscillations through the bottom MUX during that period, the challenge response value corresponding to that pairing (when measured either during an initial setup procedure or as a response to a remotely-generated challenge) is a "1"; if not, the response value is a "0". If for example, the addresses of 128 successive pairs are transmitted to the PUF, 128-bit challenge responses are generated.

APGs are operated in two modes when used for challenge-response authentication. During an initial "registration" operation, the characteristics of the PUF are measured and stored for later reference. These characteristics may be measured and stored directly, or in the form of responses generated to a set of potential challenges. The response values may be absolute or relative value of the parameters within the multiple cells that are selected within a particular range of addresses. Therefore, as a particular cell may produce the value '0' when part of one group of cells, and the value '1' when part of a different group, or when read using different challenge instructions.

Challenge instructions "tell" the APG what to do with the measured characteristics of a given cell (or range of cells). In a trivial example, the instructions would simply instruct the APG to return the measured characteristics directly. Challenge instructions may also specify a set of mathematical operations to apply to the measured characteristics in order to generate a response.

Because the PUF is secured within the server (and may be further protected using known anti-tampering methods), a hostile party cannot simply read the entire PUF array and use the information to communicate with a network of client devices. Physically reproducing ("cloning") the entire PUF device array would be a security threat; however, the random variations in circuit fabrication and other manufacturing methods which make it possible to fabricate unique PUF arrays using identical manufacturing steps possible in the first place make it unlikely that a hostile part could replicate a given PUF device array even if the design of that device were known.

Figure 6:
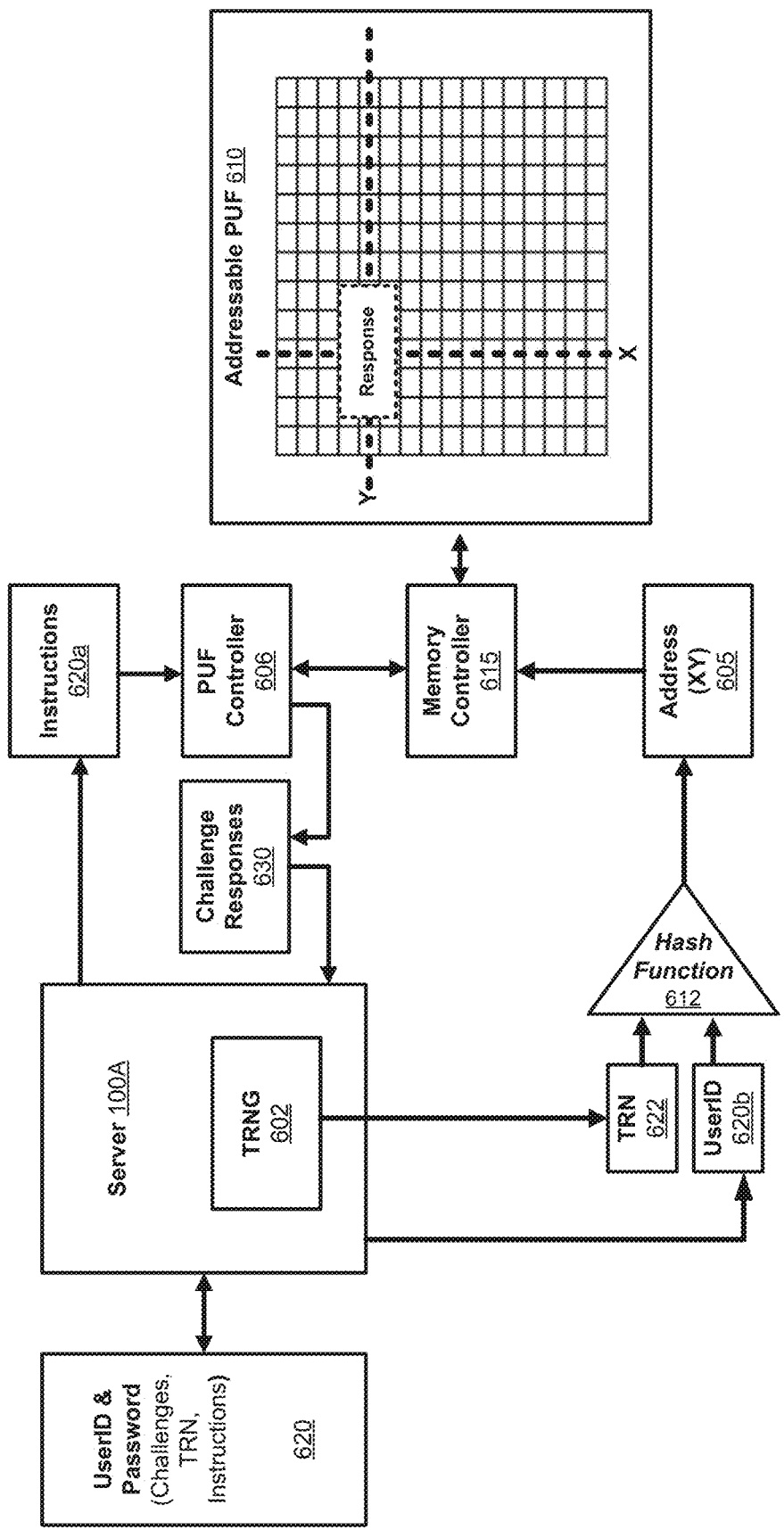
FIG. 6 depicts a flowchart illustrating elements of an example authentication method disclosed herein using an addressable PUF device.

FIG. 6 illustrates an example architecture for multifactor authentication using an addressable PUF array 610. FIG. 6 and the accompanying description will be used to illustrate various operating principles of challenge-response authentication schemes using PUFs. The PUF array 610 (shown here as a 2D-array of cells) can be addressed using a memory controller 615, which receives a specified address 605. The memory controller 615, together with the PUF controller 606 are configured to return characteristics of the PUF array 610 at the address 605 (or a range of addresses), as challenge response 630. The challenge responses 630 may be specific characteristic of queried cells (or ranges of cells), or may be derived from those characteristics by the PUF controller 606. Non-limiting examples of such characteristics are time delays of transistor-based ring oscillators and transistor threshold voltages. Other non-limiting examples include optical devices. For example the PUF device may be an optical PUF device which, when illuminated by a light source such as a laser produces a unique image. This image may be digitized and the pixels may be used to form an addressable PUF array.

In this example a user possesses a PUF such as PUF array 610. Upon activation, the user needs to securely exchange with the server 100A (or another party from which the server 100A can securely retrieve information), the measurements of physical elements describing the PUF (or information derived from those measurements). This can be a set of parameters, P, produced by measuring each cell of the PUF array 610. A request to measure the parameters and/or perform further mathematical operations on those parameters may be variously referred to as "authentication challenges" or "challenges." The initial measurements of the PUF, may be various referred to as "authentication challenge responses," "challenge responses," or simply "responses." Using this terminology, the server 100A (or another party) generates a set of challenges during an initialization process and issues to challenges to the user (or a party in possession of user's PUF at the time of the initialization). The responses obtained to the initial challenges are stored for reference by the server 100A. When the server 100A subsequently sends an authentication challenge, the user can independently re-measure the parameter(s) P at the specific locations of his PUF array to generate appropriate challenge responses. Challenges and the corresponding challenge responses represent a fingerprint of the PUF. With quality PUFs, the hamming distance between challenges and responses is small.

As shown in FIG. 6, the challenges are generated by supplying a message 620 (which includes instructions 620a and a password 620b) to the server 100A. The server 100A contains a random number generator such as the true-random-number generator (TRNG) 602, which sends the instructions 620a, which specify how to generate the challenge responses 630 to the memory controller 615. The memory controller 615 receives the instructions 620a and the desired address 605 to query. The desired address 605 is generated by a hash function 412 which hashes the combined password 620b and random number 622 to yield the address 605. Using the instructions 620a and the address 605, the memory controller 615 retrieves the appropriate challenge response 630 and delivers it to the memory controller 615, which delivers the appropriate challenge response 630 to the server 100A. In this example, all possible challenges are issued in advance and the challenge responses 630 are stored by the server 100A in a lookup table prior to the server 100A and the user communicating using the protocols described earlier. In such architectures, the PUF array 610, and memory controller 615 are possessed by the user.

Figure 7:
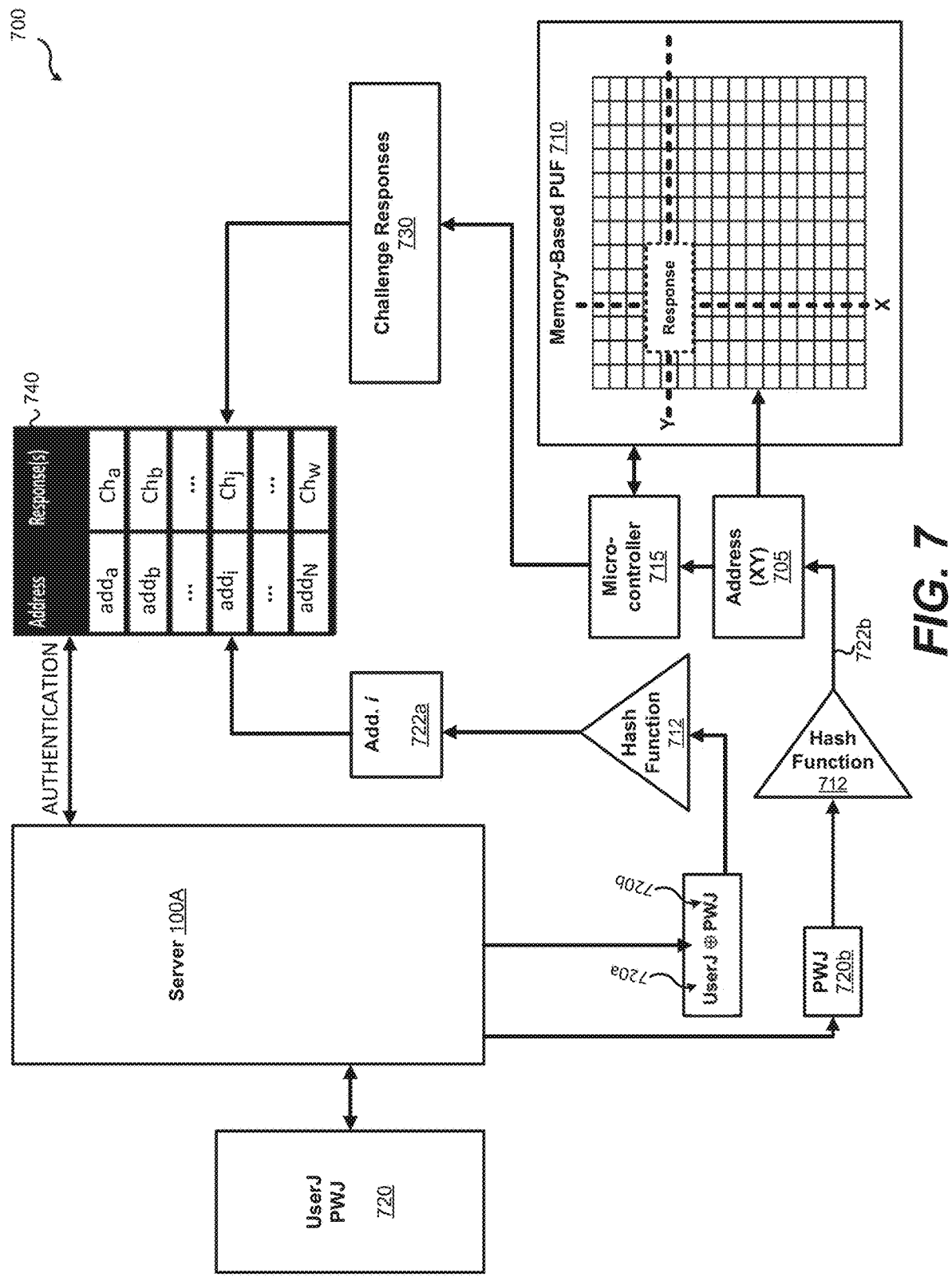
FIG. 7 depicts a flowchart illustrating additional elements of the example authentication method of FIG. 7

Now that certain operating principles have been discussed, we now describe various inventive embodiments utilizing APGs within the server 100A to provide authentication while securing user credentials against security breaches. In various embodiments disclosed herein, APGs are combined with hash-function-based password management, discussed earlier in connection with FIGS. 2-3. A block diagram describing an example of such an embodiment 700 is shown in FIG. 7. As shown, a device such as the server 100A receives a user identifier 720a and password 720b (collectively authentication information 720). The server 100A hashes the password 720b using a hashing function 712. The resulting message digest 722b is then used by a microcontroller 715 forming part of the security circuitry 112A of the server 100A to locate an address 705 in the APG 710. For example if the memory space of the APG 710 is an array of 4,096×4,096 cells, the first 12 bits of the message digest 722b can be used to find the address X in the array, and the next 12 bits to find the address Y. Starting from this address 705, challenge responses can be generated from a range of n cells starting at (or otherwise identified by) the address 705. The parameter P is then measured and responses 730 to the challenge $Ch_j$ consisting of a stream of bits $\{Ch_1, Ch_2, \ldots, Ch_n\}$ are generated. It should be understood that the 2-dimensional addressing scheme discussed is a non-limiting example and that any suitable PUF addressing scheme may be used in embodiments disclosed herein.

A second address 722a, denoted by $Add_i$ is generated using the user ID 720a and the password 720b. In this example, the user ID 720a is XORed with the password 720b and hashed using hashing function 712 to produce the message digest 722a, used as the address, The challenge response 730 (denoted $Ch_i$ for $User_j$) is stored in a look up table or database 740 at the address specified by this digest 722a, i.e., $Add_i$. Since hash functions are one-way functions, it is impossible to deduce the input of the hash function by looking at the address of a PUF array. Unlike traditional data storage units, the memory arrays used in the APG 710 are not used to store information in any conventional sense; i.e., appropriate challenge responses 730 cannot be generated from these PUFs without using instructions which, taken together with the address (or range of addresses) 705 form a valid challenge. If an attacker gains access to the database 740, a stored challenge response is useless without the message digest 722b of the corresponding password 720b. This offers additional layers of security.

The authentication process follows a similar sequence to the one described above for challenge generation. The challenge responses 730 generated from the APG 710 are compared with the previously-generated challenge responses 730 stored in the database 740 (or lookup table) at the same address. When the newly-generated challenge responses 730 agree with the previously-generated challenge responses 730 (or the responses match to a sufficient degree), authentication is successful.

FIG. 8 summarizes an example method 800 performed in connection with various embodiments to store challenge/response data, for future reference during authentication as described above. It should be understood that foregoing descriptions of various methods having express or implied sequences of steps and sub-steps are intended for purposes of illustration only and that steps may be performed in any suitable sequence. The various steps of method 800 will be described with reference to embodiment 700 for easier understanding.

At Step 1 the password 720a, i.e., $PW_J$, is input into the hash function 712 to generate a message digest 722b, i.e., $h(PW_J)$ which denotes the hash of $PW_J$. Additional security features may include the use of cryptography to protect the password and multi-factor authentication to protect the user. The hash function can be any suitable hash function, including, for example, a conventional hash function such as SHA-1.

At step 2 the message digest 722b is used to generate the address (or address range) 705 to be accessed within the PUF device 710. As suggested above, the address 705 may be the first 24 bits of the message digest, if the size of the memory array is 4,096×4,096, for example. Different possible schemes are presented below.

At step 3 the generation of a stream of challenge responses 730, denoted by $Ch_j=\{Ch_1, \ldots, Ch_n\}$ for $User_J$ are received from the APG 700, using information from n cells specified by the address (or range of addresses) 705. The exact mechanism of accessing the PUF device 710 will vary based upon the underlying device technology and various response generation protocols adapted to the particular technology implementation. In example method 800 of FIG. 8, sub-step 3.1 entails measurement of the particular parameter P, for each cell, as described above. In, sub-step 3.2, the challenge response 730 is generated using the measurement(s).

At step 4 The user ID 720a, represented by ID $User_J$, and password 720b, represented by $PW_J$, are XORed to generate a data stream, shown as $User_J \oplus PW_J$. Use of the Boolean XOR function is a non-limiting example of combining the UserID 720a and password 720b and can be replaced by other methods.

At step 5 the message represented by $User_J \oplus PW_J$ is hashed by the hashing function 712 to produce the message digest 722a, which is in turn used to specify the address in the database 740 (or lookup table) denoted by $Add_i$. If, for example, a look-up table having 4,096×4,096 positions is used, the first 24 bits of the message digest can be used to generate $Add_i$.

Finally, at step 6, The challenge responses $Ch_j=\{Ch_1, \ldots, Ch_n\}$ are stored in the database 740 (or lookup table) at the address specified by $Add_i$. In case of a collision (i.e., multiple users at the same address), multiple sets of challenge responses 730 may be stored at the same address, allowing authentication to proceed without undue complexity. In this instance, the server 100A could simply search as a many sets of challenge response 730 as needed until a match us found (or until all the challenge responses at $Add_i$ have been searched).

FIG. 9 summarizes an example method 900 performed in connection with various embodiments to authenticate a user such as user 100B. Steps 1 through 5 of example method 900 are similar to those of example method 800 described above in connection with FIG. 8 and will be similarly described with reference to embodiment 700. However, in this example method, the server 100A already has the expected challenge responses 730 stored in the database 740 (comprising security data 122A). In this method, the server 100A issues challenges to the APG 700 (i.e., the security circuitry 112A) and compares challenge responses 730 newly-generated by the APG 700 to expected values of the challenge responses 730 previously-generated as described above in connection to FIGS. 7-8.

At step 6, the stored challenge response 730 (denoted as $Ch_j$) are read by the server 100A. At step 7 the stored challenge responses 730 (denoted by $Re_j$) are compared with the challenge responses 730 newly-generated by the APG 700 using a bitwise comparison (i.e., an XOR operation).

Because the responses 730 are the product of physical measurements of the parameter(s) P, which may be influenced by external factors (e.g., temperature) and other sources of nondeterministic behavior some variation in the measured parameters is possible. Typical conventional binary PUF devices such as those described thus far produce error rates of approximately 3-10%. Generally, error rates as high as 10% are acceptable when the challenge responses are long enough (e.g., longer than 128-bits). However, ternary PUF devices described below can be used to improve the performance of APGs and reduce error rates.

Ternary PUF architectures are based on three states, and incorporate a "fuzzy state" to denote a cells whose responses are unpredictable. The error rate measured using the remaining well-behaved device states is significantly lower.

Figure 10:
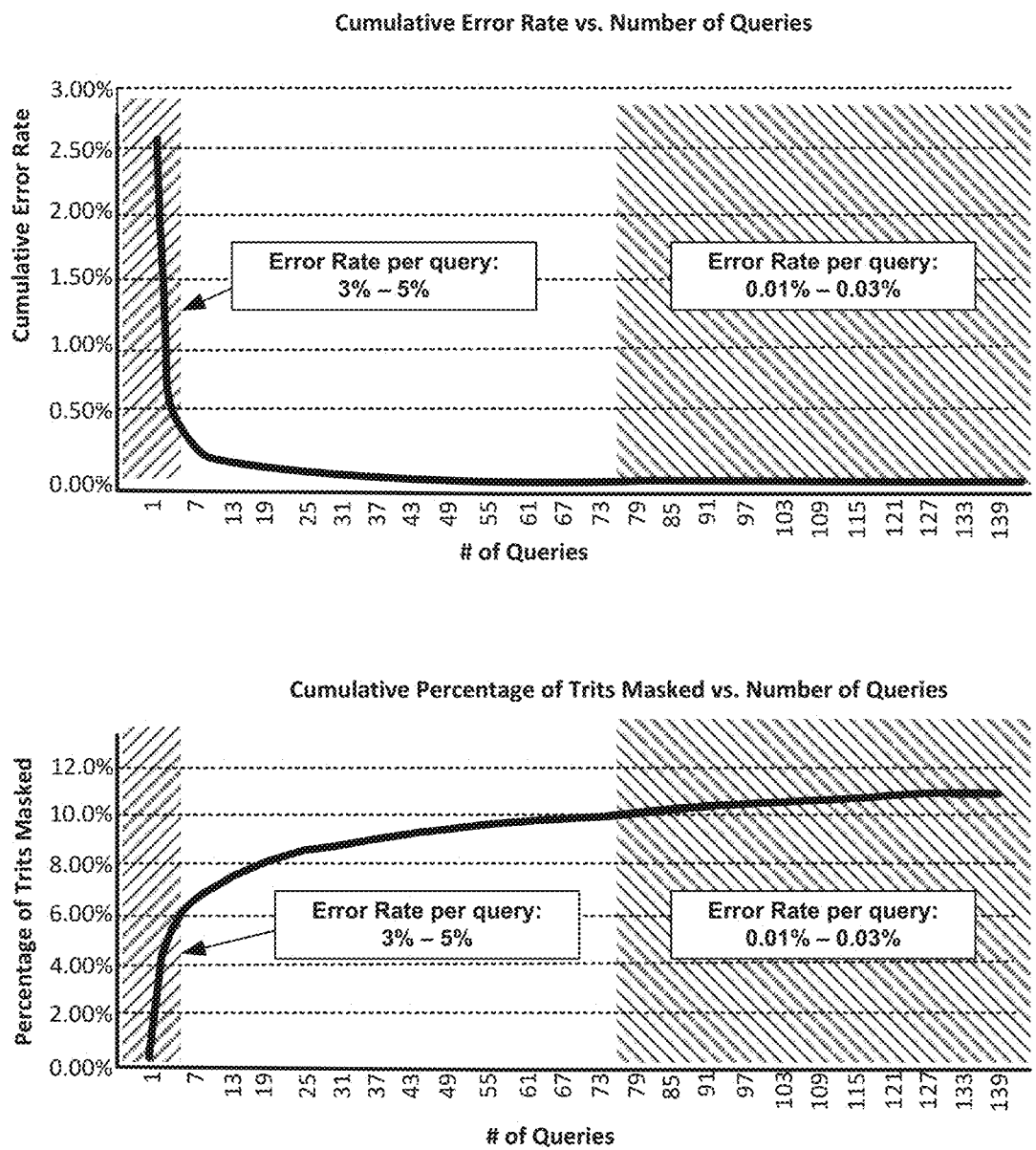
FIG. 10 depicts a graph illustrating performance of ternary PUF when used for challenge-response authentication.

FIG. 10 shows error measurements of prospective PUF devices based on commercially-available SRAM. SRAM PUFs exploit power-off/power-on cycles. Due to micro-manufacturing differences, the flip-flop of each SRAM cell will randomly emerge from being powered on in the '0' or the '1' state. The vast majority of the cells respond in a predictable way, therefore acting as a "fingerprint" of the device. SRAM arrays have been characterized, exhibiting a cumulative 3-5% CRP rate after each power-off/power-on cycle. The memory cells were then subjected to successive power-off/power-on cycles and cells exhibiting inconsistent ("fuzzy") behavior were represented by the ternary state 'X.' After 50 cycles, the 'X' state was assigned to 10% of the cells. For the remaining cells which were not assigned the 'X' state, the error rate was in the 0.01-0.03% range. The upper plot in FIG. 10 shows the effective error rate with increasing number of cycles (from 1-139) and the lower plot shows the percentage of cells identified as "fuzzy." For example, after 1 trial, the error rate is ~3-5% and very few (or zero) cells are "fuzzy." At ~70 trials, the number of masked cells is about 10% and the resulting error rate is ~0.01-0.03%.

The methods and systems described above can be modified to incorporate ternary PUF devices. In one example embodiment, the ternary state associated with each PUF element is determined during the initial generation and storage of the challenge responses 730. In this embodiment, the stored challenge responses 730 incorporate ternary values (as opposed to binary) for each element of the PUF array 710 and are stored in the database 740 as shown in FIG. 7. As an example, the ternary '0' state can be represented by the binary string (01), the "1" can be represented by the binary string (10), and the 'X' state can be represented by the binary string (11). During authentication, only values produced by well-behaved devices are used to measure the mismatch between the newly-generated challenge response 730 and its expected value. Such a protocol can be implemented using measurement of the parameter(s) P of elements in memory-based PUFs such as the PUF array 710.

In such embodiments, it is necessary to define what constitutes a "fuzzy" device and what constitutes a well-behaved device. In a non-limiting example, the values measured are binned. The bottom tertile (third) of values are chosen as the '0' state, the top tertile of values are chosen to represent the '1' state, and the middle tertile of values are assigned to the 'X' ("fuzzy") state. During response generation for authentication, the same n cells originally measured and the measured values are similarly binned to determine the appropriate binary string to use as the output for each cell.

In some embodiments, the entire PUF array 710 can be characterized in advance, and the 'X' state can be assigned to all "fuzzy" cells. In such embodiments, the previously-measured "fuzzy" cells are excluded from the authentication process. During the initial characterization of the PUF array 710, the "fuzzy" cells located at the address 705 (or within an address range specified by address 705) are ignored, and the remaining cells are treated as being well-behaved. The resulting challenge responses 730 consist of streams of bits that are stored in database (or lookup table) 740 for reference. During authentication, the same "fuzzy" cells are ignored. The newly-generated challenge responses 730 are compared with the reference values for the challenge responses 730 previously stored in the database 740 (or lookup table). In certain embodiments, the challenge responses 730 are always of the same length. As an example, in such embodiments, the challenge instructions may cause the security circuitry 110A to query the first n well-behaved cells found starting at the address 705, skipping over any "fuzzy" cells until a total of n cells have been queried.

The embodiments described thus far rely upon storing challenge responses (such as the challenge responses 730) generated by an APG (such as the APG 700 shown in FIG. 7). Each response 730 is stored in the database 740 (or lookup table) at an address determined by the message digest 722a which is the result of hashing a combination of the user ID 720a with the password 720b (e.g., User$_J$ ⊕PW$_J$). However, in some embodiments, heightened security can be realized by using additional challenge responses to specify the lookup table address as well.

Figure 11:
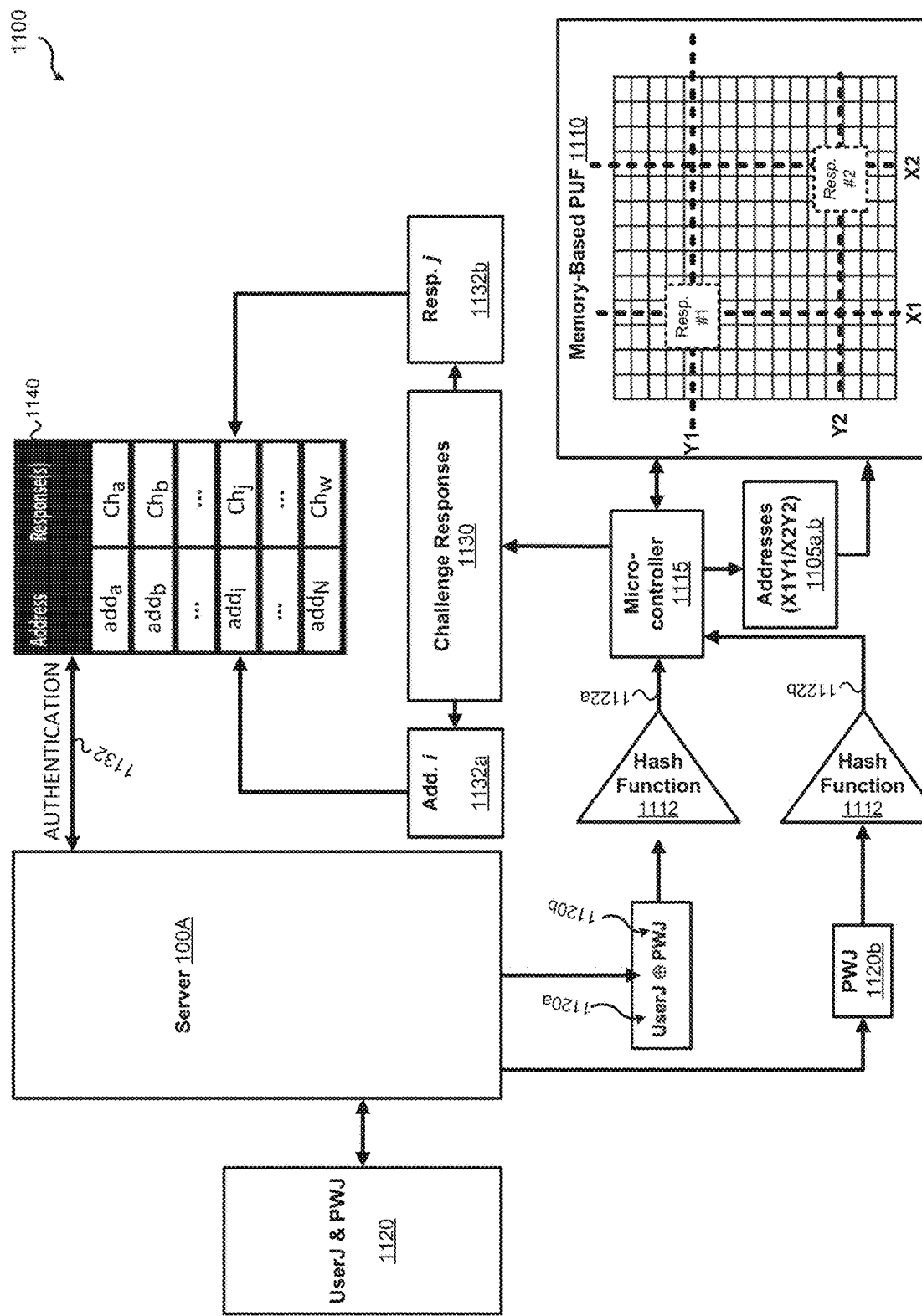
FIG. 11 depicts a hybrid flowchart and block diagram illustrating an alternate authentication system disclosed herein using a memory-based PUF device.

One such embodiment 1100 is illustrated by FIG. 11. As shown in FIG. 11, a device such as the server 100A receives a user identifier 1120a and password 1120b (collectively authentication information 1120). The server hashes a combination of the user ID 1120a and the password 1120b to produce the digest 1122a using a hashing function 1112. The server 100A also hashes the password 1120b using the hashing function 1112.

The message digest 1122a is then used by a microcontroller 1115 forming part of the security circuitry 112A of the server 100A to locate an address 1105a in the APG 1110. The address 1105a is used to generate a challenge response 1132a which is used to specify an address in the database 1140 which comprises the security data 122A of the server 100A. The message digest 1122b is similarly used to generate challenge response 1132b. This challenge response (1132b) will be used for future authentication of the user 100B to the server 100A. The association of the address 1132a with the challenge response 1132b in the database 1140 jointly form authentication information 1132.

It will be appreciated that although this approach increases security by obscuring both the password and addressing scheme used for authentication information 1132, it is susceptible to errors between the challenge response 1132b as measured initially for a given UserID and password and subsequent challenge responses 1132b for the same UserID and password due to PUF errors as described above. Specifically, a PUF error occurring in the challenge response 1132b will cause the server 100A to access the wrong address in the database 1140.

It can be shown that ternary PUFs can be used to make realization of embodiments such as embodiment 1100 more practical. Given the previously cited error rates of 3-10% for binary PUFs, the incidence of addressing errors in embodiments similar to embodiment 1100 using binary PUF devices can be estimated with statistical models such as Poisson's model. For example, if the challenge-response comparison (CRP) error rate is 10% with 24-bit response lengths, the probability of at single-bit-or-larger error in the address is 91%, and the probability of at least a two-bit-or-larger error is 69%. These error rates are prohibitively high. However, with ternary states, if the CRP error rate is 0.03% (within the range discussed above in connection with FIG. 10) the probability of a single-bit-or-larger error is only 0.7%, the probability a two-bit-or-larger error is reduced to $2.6 \times 10^{-5}$ and the probability of a three-bit-or-larger error is reduced to $6 \times 10^{-8}$.

Details of an example authentication method accounting for CRP errors are disclosed below. After receiving a challenge responses 1132a, 1132b the server 100A accesses the address corresponding to the response 1132b and compares the response 1132a with the corresponding authentication data 1132 previously stored for reference. If the response 1132a matches, authentication is successful. If the response 1132a does not match, the response 1132b may have specified an incorrect address in the database 1140 due to a CRP error. To account for possible errors in the response 1132b, the server 100A begins searching the database 1140 using addresses with a hamming distance of 1 relative to the received response 1132b. If the response 1132a matches a previously stored response in one of the other addresses, authentication is successful. If a match is not found, the server 100A may proceed to search for matches using addresses with a hamming distance of 2 relative to the received response 1132b. If a match is found at one of these addresses, authentication is successful. If a match is not found, authentication fails.

If the response 1132b specifies a 24-bit address in the database 1140, the server 100A only needs to search 24 additional addresses, since there are only 24 addresses with a Hamming distance of 1 relative to any given response 1132b. This does not represent a significant computational burden. The number of addresses with a Hamming distance of 2 from a given 24-bit string is 24-choose-2 (=276), which is still not computationally expensive to check (and is not expected to occur with high frequency). The resulting false rejection rate (FRR) of such a protocol is $6 \times 10^{-8}$, which is due to the extremely low probability of responses with Hamming distances of three or more between a newly-generated response 1132b and the correct database address, specified by the originally-generated value of the response 1132b. This level of FRR is small and acceptable to users. This protocol scales well when the size of the database 1140 increases. For example, look-up tables with 36-bit addresses can store 68G addresses, which is 65,000 larger than a look-up table bit 24-bit addresses. There are only 36 addresses with a Hamming distance of 1 with a given response and 36-choose-2 (=630) addresses with a Hamming distance of 2.

Figure 12:
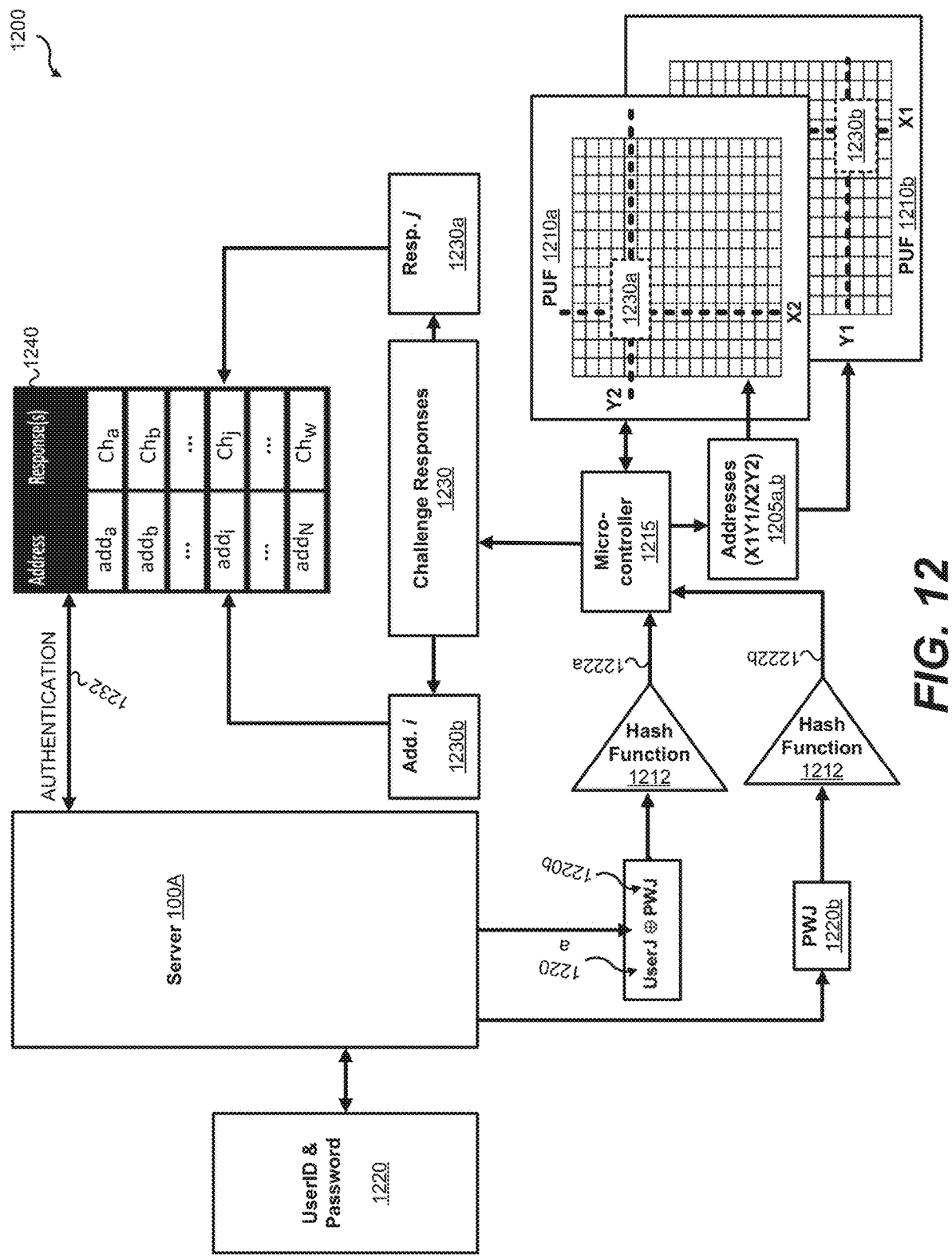
FIG. 12 depicts a hybrid flowchart and block diagram illustrating another alternate authentication system disclosed herein using multiple memory-based PUF devices.

The methods disclosed above in connection with embodiment 1100 and FIG. 11 can also be implemented using two distinct PUF arrays, as shown in FIG. 12 which depicts an example embodiment 1200. In embodiment 1200, The PUF array 1210a is used to generate a challenge response 1230a using the digest 1222a (the result of using a combination of the user ID 1220a and password 1220b as the input to the hashing function 1212) and the PUF array 1210b is used to generate challenge responses using the digest 1222b based on the password 1220b. The message digest 1222a is used by the microcontroller 1215 to access the address 1205a (or range of addresses) of the PUF array 1210a to generate the response 1230a. Similarly, the message digest 1222b is used by the microcontroller 1215 to access the address 1205b (or range of addresses) of the PUF array 1210b to generate the response 1230b. The authentication information 1232 (the association of the challenge response 1230a with the address specified by the challenge response 1232b) is stored in the database 1240.

Figure 13:
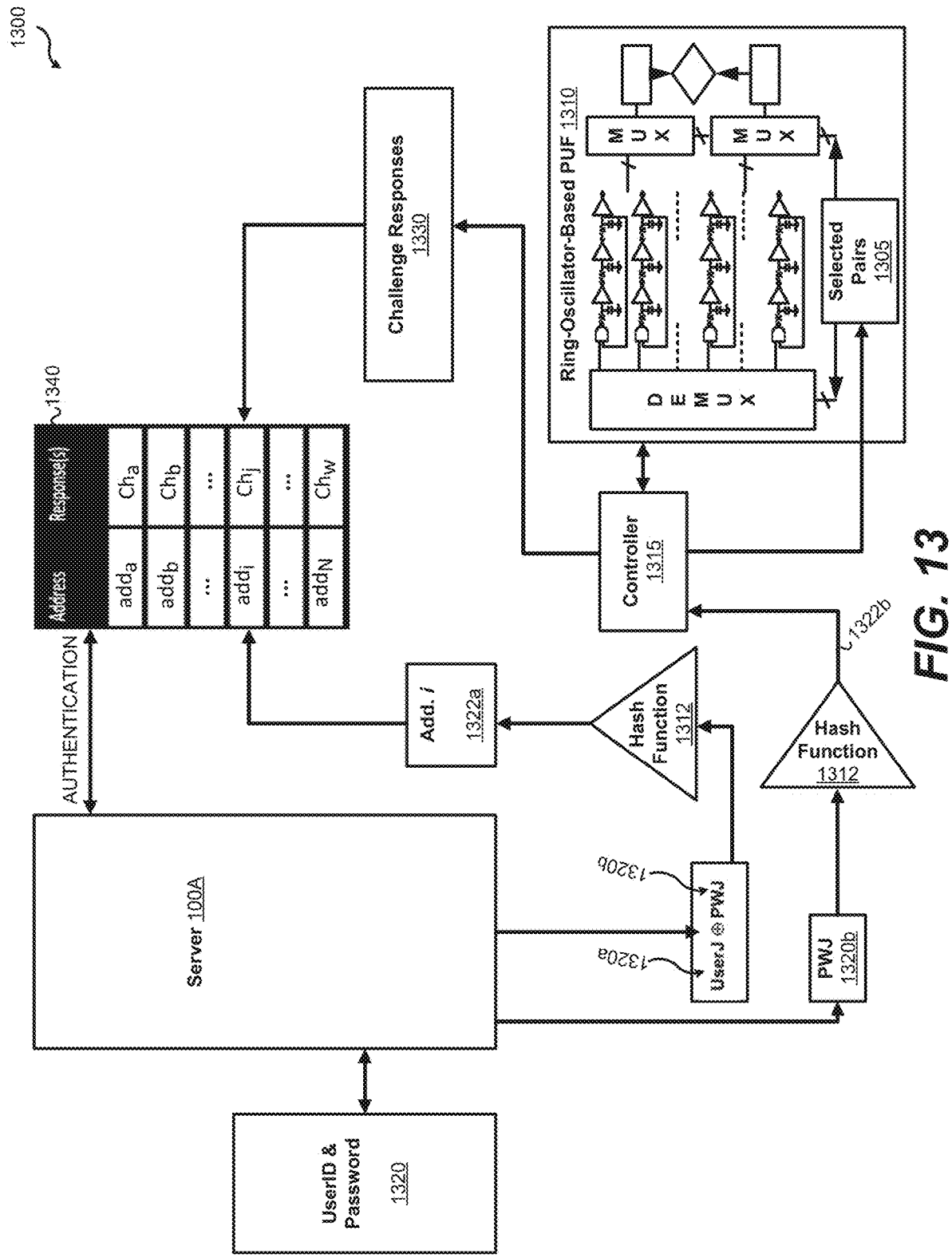
FIG. 13 depicts a hybrid flowchart and block diagram illustrating yet another alternate authentication method disclosed herein using a ring-oscillator-based PUF device.

Embodiments using PUFs designed to generate responses using methods based on logic gate delays and ring oscillators can be used instead of memory-based arrays, as previously discussed. FIG. 13 depicts an example embodiment 1300 where the PUF array 1310 comprises an array of ring-oscillator circuits. The operation of embodiment 1300 is analogous in most ways to the operation of embodiment 700. However, in embodiment 1300, the message digest 1322b specifies pairs 1305 of ring oscillator circuits rather than memory addresses (compare with digest 722b specifying address(es) 705 in embodiment 700, described in connection to FIG. 7).

Ring-oscillator PUFs can also be used as ternary PUF devices. During the generation of reference challenge response values using ring-oscillator PUF devices, a particular pair of ring oscillators are compared to produce a '0' or '1' value depending on whether the number of oscillations over a certain time period differs between the two oscillators. For example, if the first oscillator produces a number of oscillations sufficiently greater than the number produced by the second oscillator over the same time period, a '1' value is returned. Similarly if the second oscillator produces a number of oscillations sufficiently greater than the first oscillator, a '0' value is returned. When the difference is below a predetermined threshold, the APG assigns the "fuzzy" 'X' state to that pairing of oscillators. During the response generation, only the well-behaved pairs (i.e., not "fuzzy") are used to generate a '0' or '1' value. The CRP matching estimate is based on the well-behaved pairs that were generated during challenge generation, while the pairs with fuzzy state are ignored. This results in a reduction of CRP error rates.

In certain example embodiments, the message digest used to specify an address in a memory-based PUF device (e.g., digest 722b and address(es) 705 of embodiment 700) is larger than the number of bits required to specify a valid address. In this case, the message digest may be partitioned to specify multiple addresses (or address ranges). Previous examples described PUF devices with arrays of 4,096×4096 cells. The first 12 bits were used to specify the X coordinate, and the next 12 bits were used to find the Y coordinate. The n-cells located after that address are used to generate PUF challenges (or responses) that consist of n-bits. Considering message digests contain long streams of bits, typically 512, k addresses in the APG can be selected from each message digest, and m cells can be used by address to generate the n-bit challenges (or responses), with n=km. For example if n=512, and k=16 addresses are selected from the message digests, m=32 bits are generated at each address. This largely increases the randomness of the protocol.

The invention claimed is:

1. A method of providing authentication and securely storing authentication data in a computing system provided with an array of physical unclonable function devices (PUF array), the method comprising causing processing circuitry of the computing system to:
receive a first user identifier and a first user password corresponding to the first user identifier and generate:
a first message digest using the first user password and a second message digest using a combination of the first user identifier with additional information associated with the first user identifier;
a first set of PUF characteristics by measuring physical parameters of PUF devices belonging to a portion of PUF array specified by the first message digest;
a first initial challenge response by performing, using the first set of PUF characteristics, a challenge generation procedure, the procedure including:
receiving an input containing PUF characteristics; and
executing challenge instructions using the PUF characteristics contained in the input to generate a challenge response output, the challenge instructions specifying rules for generating the challenge response output from the PUF characteristics contained in the input; and
store the first initial challenge response in an addressable data structure at an address determined by the second message digest.

2. The method of claim 1 further comprising causing the processing circuitry to:
receive an authentication request transmitting a user identifier and a password and generate:
a third message digest using the user password received from the authentication request and a fourth message digest using a combination of the user identifier received from the authentication with additional information associated with the user identifier received from the authentication request; and
a second set of PUF characteristics by measuring physical parameters of PUF devices belonging to a portion of the PUF array specified by the third message digest; and
an authentication challenge response by performing the challenge generation procedure using the second set of PUF characteristics; and
output an authentication result indicating whether the user is authenticated by:
retrieving a particular challenge response from an address in the data structure corresponding to the fourth message digest;
comparing the authentication challenge response to the retrieved challenge response; and
generating the authentication result based on a Hamming distance between the authentication challenge response and the retrieved challenge response.

3. The method of claim 2, further comprising causing the processing circuitry to:
receive a second user identifier and a second user password corresponding to the second user identifier and generate:
a fifth message digest using the second user password and a sixth message digest using a combination of the second user identifier with additional information associated with the second user identifier;
a third set of PUF characteristics by measuring physical parameters of PUF devices belonging to a portion of PUF array specified by the sixth message digest; and
a second initial challenge response by performing the challenge generation procedure using the third set of PUF characteristics; and
in response to determining that the sixth message digest is identical to the second message digest, store the second initial challenge response in the data structure together with first initial challenge response at an address corresponding to the second message digest;

wherein retrieving the particular challenge response from the address in the data structure corresponding to the fourth message digest includes:
determining that the Hamming distance between the authentication challenge response and the first initial challenge response is greater than a predetermined threshold; and
in response to that determination, selecting the second initial challenge response as the particular challenge response.

4. The method of claim 3, wherein the authentication result indicates that the user is authentic when the Hamming distance between the authentication challenge response and the retrieved challenge response is less than the predetermined threshold.

5. The method of claim 2, wherein the challenge generation procedure produces a ternary challenge response output and wherein executing challenge instructions includes:
assigning one of three possible ternary values to each PUF characteristic corresponding to whether a value of that PUF characteristic lies within a first range of values, a second range of values, or a third range of values, the second range being between the first range and the second range.

6. The method of claim 2, wherein executing challenge instructions includes:
during an initial challenge generation period, assigning one of three possible ternary values to each measured PUF characteristic corresponding to whether a value of that measured PUF characteristic lies within a first range of values, a second range of values, or a third range of values, the second range being between the first range and the second range; and
during subsequent challenge generation periods, excluding PUF characteristics assigned to the second range of values from being used in the challenge generation procedure.

7. The method of claim 6, wherein executing challenge instructions includes, in response to excluding one or more PUF characteristics from the challenge generation procedure:
measuring physical parameters of additional PUF devices such that challenge generation procedure may execute the challenge instructions using at least a predetermined number of PUF characteristics.

8. The method, of claim 2 wherein the array of PUF devices comprises a plurality of oscillator circuits and wherein measuring the physical parameters of PUF devices includes measuring an oscillation period.

9. The method, of claim 2 wherein each PUF characteristic indicates a difference between an oscillation period of a first oscillator circuit and an oscillation period of a second oscillator circuit.

10. A method of providing authentication and securely storing authentication data in a computing system provided with an array of physical unclonable function devices (PUF array), the method comprising causing processing circuitry of the computing system to:
receive a first user identifier and a first user password corresponding to the first user identifier, and generate:
a first message digest using a combination of the first user identifier with additional information associated with the first user identifier and a second message digest using the first user password;
a first set of PUF characteristics by measuring physical parameters of PUF devices belonging to a portion of the PUF array specified by the first message digest;
a second set of PUF characteristics by measuring physical parameters of PUF devices belonging to a portion of the PUF array specified by the second message digest;
a first initial challenge response by executing first challenge instructions using the first set of PUF characteristics, the first challenge instructions specifying first rules for generating challenge responses using measurements of physical parameters of sets of PUF devices; and
a first challenge response address by executing second challenge instructions using the second set of PUF characteristics, the second challenge instructions specifying second rules for generating challenge responses using measurements of physical parameters of sets of PUF devices; and
store the first initial challenge response in a data structure at an address determined by the second message digest and corresponding to the first challenge response address.

11. The method of claim 10 further comprising causing the processing circuitry to:
receive a request to authenticate a user, the request transmitting a second user identifier and a second password, and generate:
a third message digest using the received user password and a fourth message digest using a combination of the received user identifier with additional information associated with the received user identifier;
a third set of PUF characteristics by measuring physical parameters of a set PUF devices belonging to a portion of the PUF array specified by the third message digest; and
a fourth set of PUF characteristics by measuring physical parameters of a set PUF devices belonging to a portion of the PUF array specified by the fourth message digest; and
an authentication challenge response by executing the first challenge instructions using the third set of PUF characteristics; and
an authentication challenge address by executing the second challenge instructions fourth the third set of PUF characteristics; and
output an authentication result indicating that the user is authenticated by:
retrieving a challenge response associated with the authentication challenge address from the data structure;
comparing the authentication challenge response to the retrieved challenge response; and
generating the authentication result when the Hamming distance between the authentication challenge response and the retrieved challenge response is less than a predetermined threshold.

12. The method of claim 11, outputting the authentication result further comprises, in response to determining that each challenge response stored at the authentication challenge address within the data structure has a Hamming distance greater than the predetermined threshold from the authentication challenge response:
selecting, as the challenge response associated with the authentication challenge address, a challenge response stored at an alternate address within the data structure, the alternate address having a Hamming distance less than a second predetermined limit from the authentication challenge address.

13. The method of claim 11, wherein the method further comprises causing the processing circuitry to:
   receive a second user identifier and a second user password corresponding to the second user identifier, and generate:
      a fifth message digest using the second user password and a sixth message digest using a combination of the second user identifier with additional information associated with the second user identifier;
      a third set of PUF characteristics by measuring physical parameters of PUF devices belonging to a portion of PUF array specified by the fifth message digest;
      a fourth set of PUF characteristics by measuring physical parameters of PUF devices belonging to a portion of PUF array specified by the sixth message digest;
      a second initial challenge response by executing the first challenge instructions using the third set of PUF characteristics; and
      a second challenge address by executing the second challenge instructions using the fourth set of PUF characteristics; and
   in response to determining that the second challenge address is identical to the first challenge address, store the second initial challenge response in the data structure at the first challenge address, together with the first initial challenge response; and
   wherein retrieving the challenge response associated with the authentication challenge address from the data structure includes:
      determining that the Hamming distance between the authentication challenge response and the first initial challenge response is greater than a predetermined threshold; and
      retrieving the second initial challenge response in response to that determination.

14. A computer-implemented authentication system comprising: processing circuitry including an array of physical unclonable function (PUF) devices; and memory, coupled to the processing circuitry, the memory storing executable instructions which, when executing the instructions cause the processing circuitry to:
   receive user credentials for a set of users, including a user identifier and a password for each user;
   generate, for each user:
      a first message digest from the password for that user; and
      a second message digest from a combination of the password for that user and the user identifier for that user;
   derive an initial challenge response for each user using the first message digest by obtaining PUF characteristics from a portion of the PUF array specified by the first message digest;
   store each initial challenge response within an addressable data structure in the memory at an address determined by the second message digest;
   receive authentication requests from users, each authentication request including a submitted identifier and a submitted password and generate, for each authentication request:
      a third message digest from the submitted password; and
      a fourth message digest from a combination of the submitted password and the submitted user identifier;
   derive an authentication challenge response for each authentication request using the third message digest by obtaining PUF characteristics from a portion of the PUF array specified by the third message digest; and
   respond to each authentication request by:
      retrieving an initial challenge response from the data structure using an address corresponding to the fourth message digest; and
      comparing said initial challenge response to the authentication challenge response.

15. The system of claim 14, wherein storing each initial challenge response within the addressable data structure includes:
   determining, for a particular value of the second message digest, that the addressable data structure already stores a previously-generated challenge response digest; and
   storing both initial challenge response and the previously-generated challenge response within the addressable data structure at the address determined by the second message digest
   wherein retrieving the initial challenge response from the data structure using the address corresponding to the fourth message digest includes:
      determining that a Hamming distance between a first challenge response stored at the address corresponding to the fourth message digest and the authentication challenge response than a first predetermined Hamming distance; and
      retrieving, as the initial challenge response, an alternative challenge response also stored at the address corresponding to the fourth message digest.

16. The system of claim 14, wherein, when the system stores each initial challenge response within the addressable data structure at the address determined by the second message digest, the instructions, when executing, cause the system, to:
   derive that address by obtaining PUF characteristics from a portion of the PUF array specified by the second message digest; and
   wherein, when the system retrieves the initial challenge response from the data structure, the instructions, when executing, cause the system to: derive the address corresponding to the fourth message digest by obtaining PUF characteristics from a portion of the PUF array specified by the fourth message digest.

17. The system of claim 16, wherein when the system compares the initial challenge response to the authentication challenge response, the instructions, when executing, cause the system to:
   determine that a Hamming distance between the authentication challenge response and the initial challenge response retrieved is greater than a first predetermined Hamming distance; and
   respond to the authentication request by:
      retrieving an alternative challenge response from a different address in the data structure, the different address having a Hamming distance less than predetermined Hamming distance from an address determined by fourth message digest; and
      comparing the alternative challenge response to the authentication challenge response.

18. The system of claim 14,
   wherein deriving the initial challenge response for each user includes:
      assigning one of three possible ternary values to each measured PUF characteristic corresponding to whether a value of that measured PUF characteristic lies within a first range of values, a second range of values, or a third range of values, the second range lying between the first range and the second range; and excluding PUF characteristics assigned to the second range of values from being used to derive the initial challenge response, and including additional PUF characteristics such that a predetermined number of PUF characteristics are included; and wherein deriving the authentication challenge response for each authentication request includes excluding PUF characteristics assigned to the second range of values from being used to derive the authentication challenge response, and including additional PUF characteristics such that the predetermined number of PUF characteristics are included.

19. The system of claim 14, wherein deriving the initial challenge response for each user includes assigning a value for each PUF characteristic based on whether a period difference between the oscillation period of a first ring oscillator circuit and a second ring oscillator circuit is positive or negative, wherein deriving the authentication challenge response for each authentication request includes assigning a value for each PUF characteristic based on whether a period difference between the oscillation period of a first ring oscillator circuit and a second ring oscillator circuit is positive or negative.

20. The system of claim 14, wherein, the instructions, when executing, further cause the system to:

generate a set of all possible PUF characteristics of the array of PUF devices;

assign each possible PUF characteristic to a range indicating the value of that characteristic within a statistical distribution of values for the the set of all possible PUF characteristics; and exclude PUF characteristics from a particular range of values from being used to derive challenge responses.

* * * * *